United States Patent [19]
Ansberry et al.

[11] Patent Number: 5,887,170
[45] Date of Patent: Mar. 23, 1999

[54] SYSTEM FOR CLASSIFYING AND SENDING SELECTIVE REQUESTS TO DIFFERENT PARTICIPANTS OF A COLLABORATIVE APPLICATION THEREBY ALLOWING CONCURRENT EXECUTION OF COLLABORATIVE AND NON-COLLABORATIVE APPLICATIONS

[75] Inventors: Catherine Malia Ansberry, Redmond; Jay Douglas Freer, Bellevue; Todd W. Fuqua; Erik Peter Mesterton, both of Redmond, all of Wash.; Catherine Ann Stillwagon, Upper Saddle River, N.J.; Ching-Yun Yang, Austin, Tex.

[73] Assignee: International Business Machines Corporation, Armonk, N.Y.

[21] Appl. No.: 387,501

[22] Filed: Feb. 13, 1995

[51] Int. Cl.$^6$ .................................................. G06F 15/16
[52] U.S. Cl. ...................................... 395/687; 395/200.35
[58] Field of Search ................................. 395/680, 200.35, 395/682

[56] References Cited

U.S. PATENT DOCUMENTS

| | | | |
|---|---|---|---|
| 4,129,859 | 12/1978 | Iwamura et al. | 340/324 |
| 4,442,295 | 4/1984 | Sukonick | 364/521 |
| 4,533,910 | 8/1985 | Sukonick et al. | 340/721 |
| 4,642,790 | 2/1987 | Minshull et al. | 364/900 |
| 4,736,407 | 4/1988 | Dumas | 379/96 |
| 4,796,201 | 1/1989 | Wake | 364/518 |
| 4,831,556 | 5/1989 | Oono | 364/521 |
| 4,845,644 | 7/1989 | Anthias et al. | 364/521 |
| 4,860,217 | 8/1989 | Sasaki et al. | 364/518 |
| 4,893,326 | 1/1990 | Duran et al. | 379/53 |
| 4,937,856 | 6/1990 | Natarajan | 379/158 |
| 4,939,509 | 7/1990 | Bartholomew et al. | 340/717 |
| 4,953,159 | 8/1990 | Hayden et al. | 370/62 |
| 4,974,173 | 11/1990 | Stefik et al. | 364/521 |
| 5,003,532 | 3/1991 | Ashida et al. | 370/62 |
| 5,062,040 | 10/1991 | Bishop et al. | 364/200 |
| 5,065,347 | 11/1991 | Pajak et al. | 395/159 |
| 5,119,319 | 6/1992 | Tanenbaum | 364/514 |
| 5,148,154 | 9/1992 | MacKay et al. | 340/712 |
| 5,148,521 | 9/1992 | Ebbers et al. | 395/155 |

(List continued on next page.)

FOREIGN PATENT DOCUMENTS 0 279 558 B1  2/1988  European Pat. Off. .

OTHER PUBLICATIONS

D. M. Chess et al., IBM Technical Disclosure Bulletin, vol. 30, No. 6, Nov. 1987.

P. A. Appino et al., IBM Technical Disclosure Bulletin, vol. 35, No. 4A, Sep. 1992.

S. P. Thompson, IBM Technical Disclosure Bulletin, vol. 36, No. 06B, Jun. 1993.

Nye Adrian, Xlib Programming Manual, O'Reilly & Assoc., pp. 75–76 Mar. 1993.

Nye, Adrian, Xlib Programming Manual, O'Reilly & Assoc., pp. 5–6,9–10 Mar. 1993.

*Primary Examiner*—Thomas C. Lee
*Assistant Examiner*—Albert Wang
*Attorney, Agent, or Firm*—Monica D. Lee; Andrew J. Dillon

[57] ABSTRACT

A method and system provide for selectively distributing communications between an application and multiple servers, allowing cooperative use of a single copy of an application. The system is situated between an application and the multiple servers. Requests from the application, responses to the requests, and events from the multiple servers, are managed in such a way that each server believes it is connected directly to the application and the application believes it is connected directly to a single server. The requests are categorized and distributed to the servers based on the type of request. The responses to these requests may be sent to the application or discarded based on the type of request and the role of the server sending the request. The events are also categorized and, based on the role of the server causing the event, they may be passed on to the application or discarded.

10 Claims, 3 Drawing Sheets

U.S. PATENT DOCUMENTS

| | | | |
|---|---|---|---|
| 5,175,854 | 12/1992 | Cheung et al. | 395/650 |
| 5,179,652 | 1/1993 | Rozmanith et al. | 395/155 |
| 5,191,644 | 3/1993 | Takeda | 395/158 |
| 5,195,086 | 3/1993 | Baumgartner et al. | 370/62 |
| 5,214,784 | 5/1993 | Ward et al. | 395/800 |
| 5,241,625 | 8/1993 | Epard et al. | 395/163 |
| 5,280,583 | 1/1994 | Nakayama et al. | 395/200 |
| 5,289,574 | 2/1994 | Sawyer | 395/157 |
| 5,293,619 | 3/1994 | Dean | 395/650 |
| 5,379,374 | 1/1995 | Ishizaki et al. | 395/155 |
| 5,392,400 | 2/1995 | Berkowitz et al. | 395/200 |
| 5,557,725 | 9/1996 | Ansberry et al. | 395/153 |

SYSTEM FOR CLASSIFYING AND SENDING SELECTIVE REQUESTS TO DIFFERENT PARTICIPANTS OF A COLLABORATIVE APPLICATION THEREBY ALLOWING CONCURRENT EXECUTION OF COLLABORATIVE AND NON-COLLABORATIVE APPLICATIONS

CROSS-REFERENCE TO RELATED APPLICATIONS

The present application is related to U.S. patent application Ser. No. 08/387,500, entitled Method and System For Switching Between Users In A Conference Enabled Application now U.S. Pat. No. 5,557,725, U.S. patent application Ser. No. 08/387,502, entitled Method for Managing Top-Level Windows Within a Conferencing Network System, U.S. patent application Ser. No. 08/387,503, entitled Method For Managing Visual Type Compatibility In A Conferencing Network System Having Heterogeneous Hardware now U.S. Pat. No. 5,715,392, U.S. patent application Ser. No. 08/387,504, entitled Method To Support Applications That Allocate Shareable Or Non-Shareable Colorcells In A Conferencing Network System Having A Heterogeneous Hardware Environment, U.S. patent application Ser. No. 08/387,505, entitled Method For Managing Pixel Selection In A Network Conferencing System, U.S. patent application Ser. No. 08/387,506, entitled Method And Apparatus For Translating Key Codes Between Servers Over A Conference Networking System now U.S. Pat. No. 5,640,540, all filed of even date herewith by the inventors hereof and assigned to the assignee herein, and incorporated by reference herein.

BACKGROUND OF THE INVENTION

1. Technical Field

The present invention relates in general to the field of data processing systems and in particular to the field of multiple user systems. Still more particularly, the present invention relates to the field of enabling multiple users to simultaneously use a single user application.

2. Description of the Related Art

The need to communicate as a group when the participants are not in the same room is becoming increasingly common. Past solutions include the use of faxes, teleconferencing and video conferencing. However, there have been few solutions for groups wanting to interact through a computer application. The participants can travel and meet in a single physical location, but the expense is often prohibitive. The participants could use a file sharing arrangement, but they would only be able to see their own session, not what the other participants are doing. Another approach is to allow everyone to see a view of one person's screen, but allow only the person with the application to interact with the application. Rewriting existing software to function in a multiuser mode is rarely a feasible solution.

The use of a conference has been proposed, and allows all participants to see the same working session. The use of this type of system allows pre-existing applications written for a single-user environment to be used from within the framework of a multi-user conference. A conferencing enabling module is located between the application and the users, and controls access to the application. These types of systems allow pre-existing applications to be used in a conference without the need for modifying the application. With this approach the problems which arise relate to handling input from multiple users.

The pre-existing applications are written with the assumption that they will be used by a single user. This assumption can cause some problems in a conferencing system because it leads to other assumptions. If there is only one user then the hardware of that user is not likely to change, the application is receiving only one stream of input, and the user wants communication from the application. These assumptions do not always hold true in a conferencing environment. The users in the conference may have different hardware, input may be sent from several workstations, and some users may be working on other applications, either in the conference or locally, and do not want communication from the application. The conferencing enabler must be able to handle outputs from and inputs to the applications and workstations so the application being conferenced is protected by giving the application the appearance of a single user environment.

U.S. Pat. No. 5,195,086, issued to AT&T Bell Laboratories, discloses a communication conferencing application which controls multiple concurrent calls sharing applications. This is effectuated by pseudo servers which control the flow of events from the servers to the application and necessary X resource identifier translation. This implementation only allows one party to input at a time. The method for controlling the flow of events for the X resource identifier translation is mentioned but not disclosed.

A system has also been disclosed by R. Wiss in the X Windows/MOTIF User Interface Server document. In this disclosure a system and method are described for the dynamic sharing of user interfaces which are coupled to applications, and a window management system provides concurrent event handling for multiple applications. This system and method controls the events from user interfaces of multiple applications.

U.S. Pat. No. 5,293,619, entitled "Method and Apparatus for Collaborative Use of Application Program", has a similar approach to the current invention. It discloses a single system, between an application and multiple X servers, which passes output requests from the application to the servers and passes events from the servers to the application.

One problem with the approach of the '619 patent is that, by passing requests to all servers, users cannot use applications other than the currently conferenced application. An example of the problem is when the conferenced application issues a request to freeze the keyboard while it is doing some type of activity. If this request is sent to all users, their keyboards will be frozen until the conferenced application has issued the unfreeze keyboard request, thereby inhibiting a user from doing any activity outside the conferenced application, such as checking E-mail.

Another problem with system described in the '619 patent is that by passing all events from the servers to the application, the program can get confused unless the users coordinate themselves well. An example of this problem occurs when two engineers are working on a CAD drawing of a widget and one engineer wants to move a part of the widget while the other engineer wants to delete the same part of the widget. Unless the two engineers coordinate their activities over the phone, the command to delete the part could be entered before the other engineer attempts to move the part and the program would try to move a nonexistent part. Unless there is sufficient error handling already in the application, the application could crash.

The usefulness of the '619 patent is also limited because it assumes the minimum common hardware for the servers. If all servers but one had a mouse, the conferencing system wouldn't be able to recognize mouse capabilities. If the user without the mouse just wanted to observe and not input, the conference is still limited. This limits the capabilities of the system. This limitation could be even more of a problem if the hardware capabilities are mutually exclusive. The requirement that the workstations and applications be predetermined before invoking the conference, and can't be changed during the conference, limits the usefulness of the system of the '619 patent. If during the conference it is determined that different users or applications are either necessary or unnecessary, the conference must be closed and restarted with the new configuration.

Therefore, it will be apparent that a need exists for an improved method and system whereby a standardized system allows a single application to be distributed to multiple users in a conference to use concurrently without modification to the application.

SUMMARY OF THE INVENTION

It is therefore one object of the present invention to provide a system which allows multiple servers to use a single copy of an application.

It is another object of the present invention to allow each participant in the conference to interact with the application.

It is yet another object of the present invention to distribute application requests to one or more participants' server and manage the responses.

It is yet another object of the present invention to control events from each of the servers in the conference and decide which to send to the application.

The foregoing and other objects are achieved as is now described. A method and system provide for selectively distributing communications between an application and multiple users, allowing cooperative use of a single copy of an application. The system is situated between an application and the multiple servers running the application. Requests from an application, and the responses to them, from multiple servers running the single application, and events from multiple servers running the application, are managed in such a way that each server believes it is connected directly to the application and the application believes it is connected directly to a single server. The requests are categorized and distributed to the servers based on the type of request. The responses to these requests may be sent to the application or discarded based on the type of request and the role of the server sending the request. The events are also categorized and, based on the role of the server causing the event, they may be passed on to the application or discarded.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF A PREFERRED EMBODIMENT

Figure 1:
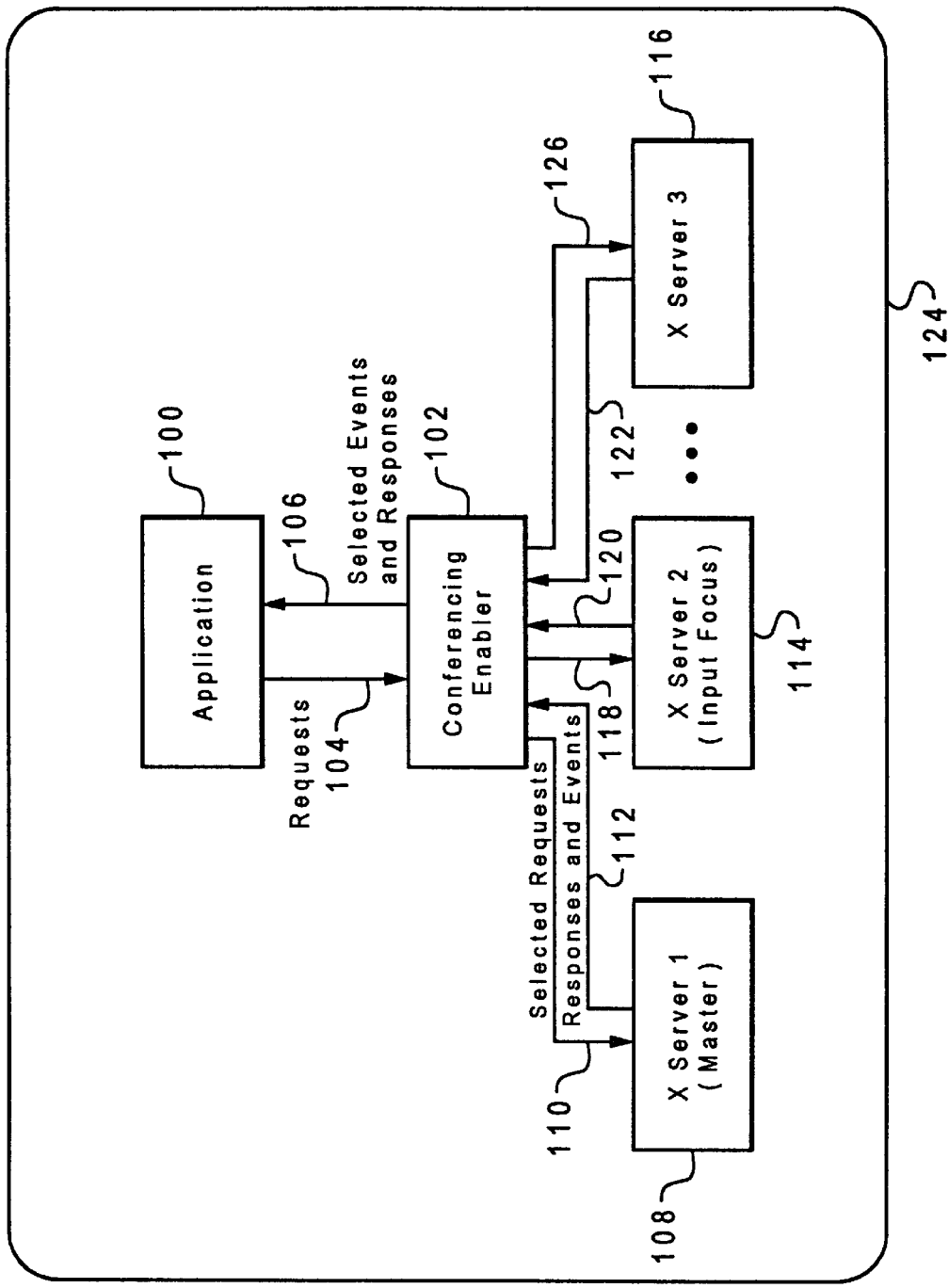
FIG. 1 depicts a block diagram of a conference in accordance with a preferred embodiment of the present invention.

With reference to the figures and in particular with reference to FIG. 1, there is depicted a pictorial representation of the flow of information in the preferred system. The present invention is part of the conferencing enabler 102. The conference enabler 102 comprises software that conceptually resides between an X Windows application and the X server. A conference is the shared use of an application by multiple users each having the same view of the program. The conference exists in an X Windows environment with multiple X servers. Those skilled in the art will recognize the variety of networks and workstations which could be used.

The conferencing enabler 102 is a program which runs continuously as a demon process in the background. It is conceptually situated between an application 100 and an X server. Its physical location is irrelevant, as it may actually be on the same workstation as the application, or on the X server, or at some other location. It is only required that both the X servers in the conference and the application have network access to the conferencing enabler. The conferencing enabler 102 appears to the application 100 to be an X server, while at the same time appearing to an X server to be an application. The conferencing enabler 102 then connects to multiple X servers on behalf of the application. Each participant in the conference may interact with the distributed application. The application 100 does not know that it is being distributed to multiple X servers. The conferencing enabler 102 determines how to multiplex and de-multiplex the requests from the application 100 and the replies, events and errors from the X servers in such a way that both the application 100 and the X servers are receiving meaningful information.

The conferencing enabler 102 receives requests 104 from an application 100 and distributes them among the servers 108, 114, 116 in the conference 124 associated with that application 100. When a request is received, the conferencing enabler 102 must determine which X servers must receive the request. The conferencing enabler 102 also receives events and responses to requests 112, 120, 122 from the X servers 108, 114, 116 and determines which are sent 106 to the application 100. The events from the X servers are managed in such a way as to present a consistent input stream for the application 100.

The conference 124 begins by a user requesting a conference from the server, in this case X server 108. Only certain users may start a conference. The X server which initiates the conference, in this case X server 108, is given the role of master. The master controls the conference 124. Only one X server can be the master in a conference and once the role is established it is irrevocable. If the master 108 leaves the conference 124, the conference 124 is closed and all applications associated with that conference 124, in this case 100, are terminated. The first X server 108 is also initially assigned the role of input focus. There can only be one server assigned the role of input focus for each application 100 in the conference 124 at any one time, but this role can be switched among the X servers 108, 114, 116 in the conference by predetermined triggers.

For purposes of example, X server 114 is the input focus. The input focus 114 is the only server allowed to input to the application by key presses or button events. The X servers of the users in the conference that are not assigned the role of master 108 or input focus 114 have no specific role. These servers can display and manipulate the display of the applications but they can not input to the application without obtaining the input focus role. Because the application believes that it is connected to a single server, the role of master 108 represents the hardware of the single server and the input focus 114 represents the display and input of the single server. The aster 108 is not allowed to change because the hardware of the X server attached to the application is not expected to change while the application is running. Limiting the input focus to one X server at a time ensures that the application has one view of the display and input from one X server. Otherwise the application is required to do something it wasn't designed to do.

After the first X server 108 has started the conference 124, other users may request to join the conference 124 from their servers, X server 114 and X server 116. With each request a small amount of code is place on the server regarding: members of the conference, who can join, who can launch an application, etc. These are typical user interface functions, known in the art, and will not be further described herein. After the conference 124 is established, members 108, 114, 116 of the conference 124 can leave, except the master 108, and others can be added. Once the master 108 has started the conference 124, certain X servers can launch an application 100 for the conference. More than one application 100 can be launched for a given conference 124 with the same copy of the conferencing enabler 102. The conference enabler 102 can distinguish the requests, responses and events for the different applications.

Figure 2:
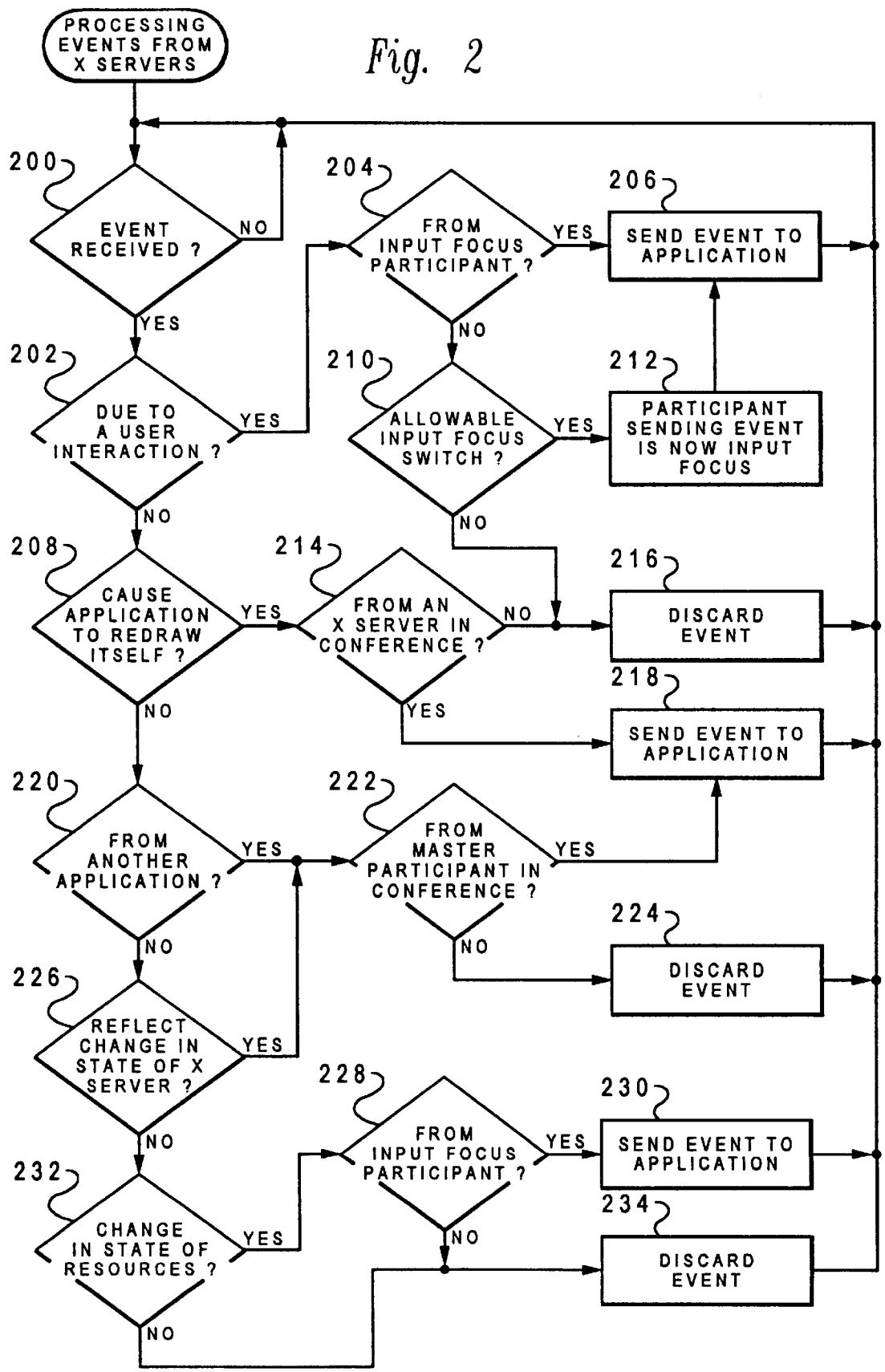
FIG. 2 depicts a logic flow illustrating event handling in the preferred embodiment of FIG. 1.

The invention takes the events 112, 120, 122 from the X servers 108, 114, 116 and determines which category they are a member of, and which X server they originated from, to determine whether they are sent to the application 100 or discarded. FIG. 2 is a flow representation of the logic involved in determining whether the events 112, 120, 122 are sent to the application 100. Referring to FIG. 2, when the conferencing enabler 102 receives 200 an event 112, 120, 122 from an X server 108, 114, 116, the type of event and the X server from which it originated determine whether the event is passed on to the application 100 from the X servers 108, 114, 116.

If the event 112, 120, 122 received 200 is of the type which is due to a user interaction 202, such as a key press, if (204) it is from the input focus 114 it is sent 206 to the application 100. If it is not from the input focus it is discarded 216 unless 210 it is an allowable input focus switch, in which case the participant sending the event is now the input focus 212 and 206 the event is sent to the application 100. The rationale for sending these type of events to the application 100 is that the input focus 114 is the only X server allowed to supply input to the application 100. This ensures that the application 100 does not receive an inconsistent sequence of events originating from multiple participants. The exception exists when the focus is to be changed.

If the event 112, 120, 122 received 200 is of the type which causes an application 100 to redraw itself 208 and 214 it is from an X server in the conference 124 it is 218 sent to the application 100, otherwise it is discarded 216. An example of this type of event occurs when a window which was previously covered becomes exposed. The rationale for sending these type of events to the application 100 if they are from any X server in the conference 124 is to ensure that the application 100 is displayed correctly on every X server. Since participants can interact independently with the conferenced application, taking these type of events only from one X server will not ensure the application is correctly displayed on every X server. If a user is working on a different application, their view of the conferenced application will be updated, but they will be otherwise unaffected.

If the event 112, 120, 122 of any type is received 200 from another application and it is 222 from the master 108 in the conference 124 it is 218 sent to the application 100, otherwise it is discarded 224. The rationale for sending these type of events to the application 100 only if they are from the master 108 in the conference 124 is because if this type of event is received it means that two applications are trying to communicate. If the other application, the one sending the event, is also part of the conference, then the event will only be received on the master and it should be sent on to the application. If the event is being sent from an application that is not part of the conference, then it is only sent if it is received on the master so as to continue the illusion that the master's X server is the only one connected to the application.

If the event 112, 120, 122 is received 200 is of the type which reflects a change in the state in the client's resources 232 and 228 it is from the input focus 114 for the application 100, it is 230 sent to the application 100, otherwise it is discarded 216. An example of this type of event is one which indicates the window has become mapped. The rationale for sending these type of events to the application 100 only if they are from the input focus 114 is because these type of events are most likely generated as a result of a request from the application 100 or from another client connected to the same X server and are most likely sent in response to a user interaction from the input focus 114. They are sent only from the input focus 114 to ensure the appearance of a single X server inputting to the application 100.

If the event 112, 120, 122 received 200 is of the type which reflects a change in the state of the X server 226 and it is from the master 108 in the conference 124, it is 230 sent to the application 100, otherwise it is discarded 234. An example of this type of event is one which indicates that the keyboard key mappings have changed. The rationale for sending these type of events to the application 100 only if they are from the master in the conference 124 is to ensure the application 100 is presented with a consistent X server. Because the application 100 believes it is connected to a single X server, the application 100 could become confused if state changes were forwarded from other servers.

Figure 3:
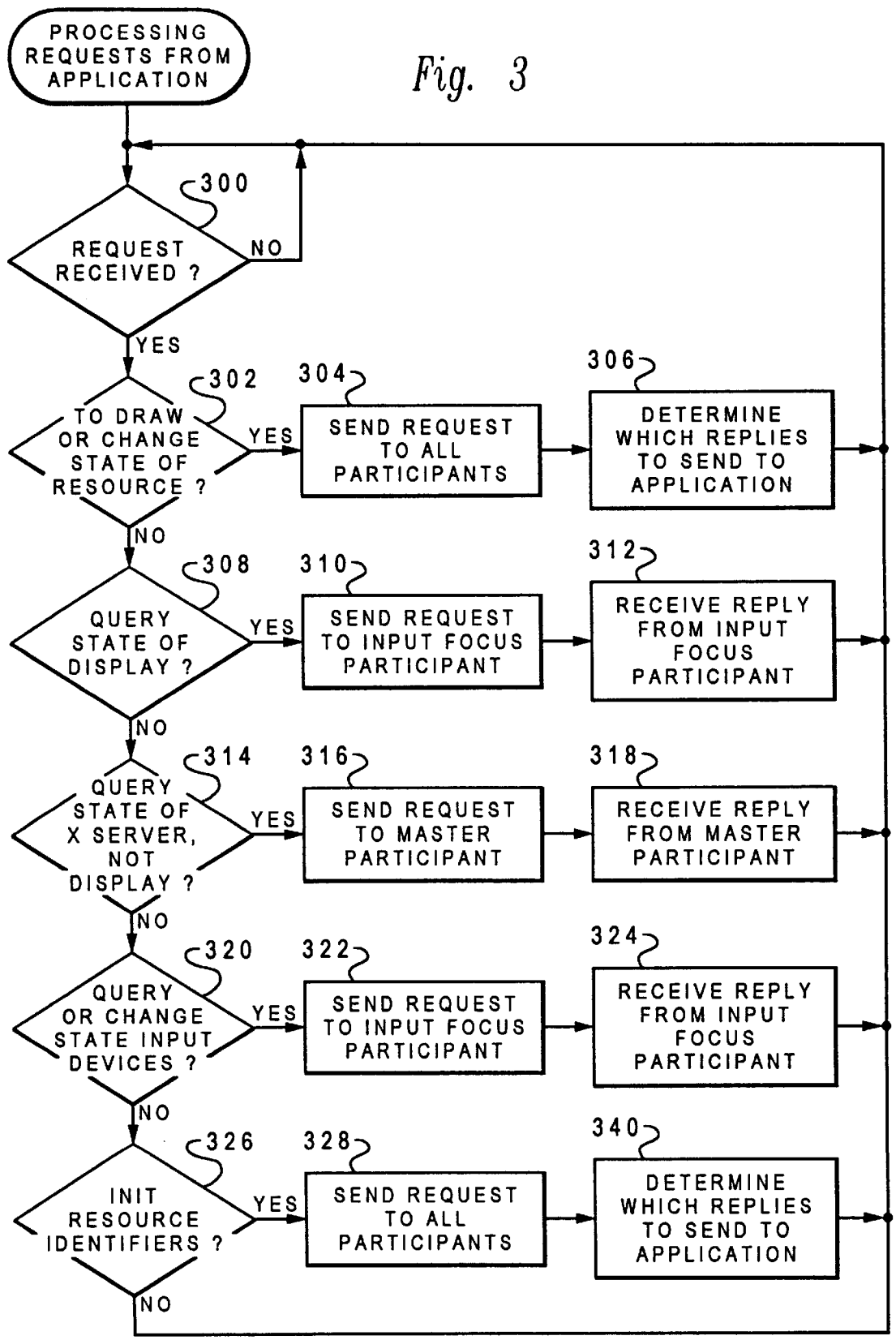
FIG. 3 depicts a logic flow illustrating request handling in the preferred embodiment of FIG. 1.

The conferencing enabler receives the requests 104 from the application 100 and determines which type they are to determine which X servers receive the requests 104 and which responses to these requests to send back to the application 100. FIG. 3 is a representation of the logic involved in determining which X server 108, 114, 116 the requests 104 from the application 100 are sent to. When the conferencing enabler 102 receives 300 a request 104 from an application 100, the type of request 104 determines which X servers 108, 114, 116 the request is sent to and which replies to the request 104 are to be received by the application 100 from the X servers 108, 114, 116.

If the request 104 is of the type which is to draw geometry or change the state of a resources 302 then 304 the request 104 is sent to all X servers 108, 114, 116. An example of this type of request is one which asks to draw a line. The rationale for sending these type of requests to all of the X servers is so each X server maintains nearly identical states. It is important that everyone is able to view the same image. There are no replies to these type of requests, but an X server may respond with an error. If an error is received from an X server, generally they are discarded 306 unless they are from the master 108. The reason only the errors from the master 108 are passed back to the application 100 is because the errors will usually be due to something the application did wrong, so it is sufficient to receive the error from one X server and for consistency the master 108 is chosen.

If the request 104 is of the type which queries the state of the display 308 of an X server, then 310 the request 104 is sent to the input focus 114. An example of this type of request is one which asks about the current size or contents of a window. The rationale for sending these type of requests only to the input focus 114 is that each X server can have significantly different views because they are allowed to minimize, cover or even close windows they are not specifically interested in. The input focus 114 should have a view which matches the application's perception of the state of the display, so it should be only the X server 114 which is allowed to provide input to the application 100 which supplies the state of the display. It is important that the application 100 believe it is attached to only one X server with only one display. The replies to these type of requests are received 312 only from the input focus 114 for the same reasons they are only sent to the input focus 114.

If the request 104 is of the type which queries the state of the X server 314, then 316 the request 104 is sent to the master 108. An example of this type of request is one which asks about the fonts available on the server. The rationale for sending these type of requests only to the master 108 is because it is important that the application 100 believe it is attached to only one X server 108, and the state of that X server 108 is not expected to change during the running of the application. The replies to these type of requests are received 318 only from the master 108 for the same reasons they are only sent to the master 108.

If the request 104 is of the type which queries or changes the state of input devices 320 of an X server, then 322 the request 104 is sent to the input focus 114. The rationale for sending these type of requests only to the input focus 114 is because each X server can have significantly different views. Because these requests may change the state of input devices the input focus 114 should be forced to match the application's 100 view of input devices while the other X servers need not be. An example of this type of request is a request which changes the location of the pointer. The input focus 114 should have the correct pointer location while other X server users may be working on a different application and their pointer should not be changed. It is important that the application 100 believe it is attached to only one X server with only one display. The replies to these type of requests are received 324 only from the input focus 114 for the same reasons they are only sent to the input focus 114.

If the request 104 is of the type which initializes resource identifiers 326 then 328 the request 104 is sent to all X servers 108, 114, 116. An example of this type of request is one which asks the server to create an atom. The rationale for sending these type of requests to all of the X servers is that the request creates a resource to be used in the future, so that resource must be created on all of the X servers in order for the subsequent request to be successful. Some of these type of requests may generate either replies or errors. Replies are sent from the master, simply so that the application receives resource identifiers that are in accord with those that exist on the master. Errors are returned from the master because an error from this type of request usually indicates that the application has done something wrong to generate that error. For consistency, therefore, the error is returned if it comes from the master.

Several conferences can utilize the conferencing enabler 102 at the same time. The conferences can be made up of different combinations of X servers. Each conference 124 has its own master 108 and each application within a conference 124 has its own input focus 114. Each conference 124 can have more than one application running.

A typical example of the use of this system and method is in a help desk situation. If a user is having a problem with an application they can conference with the helper. The user can show the helper where the problem is on the application and the helper can see the same view of the application the user is interacting with, without being in the same room looking at the display of the user's X server. The input focus can then be switched, allowing the helper to show the user how to fix the problem or the correct way to operate the application such that the user sees the helper's interaction with the application. During this session additional applications or people can be added to solve the problem. The user and helper communicate over the telephone during the conference to explain what they are doing and to coordinate the switching of the input focus.

Another example of the use of the invention is a team working on a project, each member of the team possibly having a workstation with a different hardware configuration than the others. The project leader begins the conference and the team joins the conference. While the engineers work together to design their widget, one of the engineers gets an E-mail message. She switches over to the E-mail to read her message while the other engineers continue designing and are unaffected. After their design is complete, one of the engineers brings up a simulation program to see how the new design will perform. All participants can see the simulation program. To interpret the data another engineer is added to the conference to see where problems exist in the new design as pointed out by the simulation program. Once the other engineers know what problems they need to fix, the simulation analyst leaves the conference and the conference drops the simulation program. The problem doesn't involve some of the engineers so they too may leave the conference.

While the invention has been particularly shown and described with reference to a preferred embodiment, it will be understood by those skilled in the art that various changes in form and detail may be made therein without departing from the spirit and scope of the invention.

What is claimed is:

1. A management system for executing collaborative and non-collaborative applications within a distributed computing environment, said system comprising:

at least one collaborative application;

at least one non-collaborative application;

a plurality of participants, wherein one participant is assigned the role of master, for controlling the system, and one participant is assigned the role of input focus, for inputting data to said at least one collaborative application;

an interface which facilitates communication between each of said plurality of participants and said at least one collaborative application; and means within said interface for selectively classifying and distributing communication requests from said at least one collaborative application to said plurality of participants based upon categories of the classified requests, and responses and events from said plurality of participants to said at least one collaborative application wherein selected requests from said collaborative application are sent to all of said plurality of participants; wherein selected requests from said at least one collaborative application which query the state of a participant not directly related to a display are sent only to said master participant; and wherein requests from said collaborative application which query the state of input devices are sent only to said input focus participant so as to permit the manipulation and execution of said at least one non-collaborative application by all other participants.

2. The management system of claim 1, wherein said classified request categories include:

requests to draw or change the state of the operating system's resources, requests to query the state of the display, requests to query the state of a participant not directly related to the display, requests to query the state of input devices, and requests which initialize resource identifiers for said at least one collaborative application.

3. The management system of claim 2, wherein:

said requests from said at least one collaborative application which draw or change the state of the operating system's resources are sent to all of said plurality of participants;

said requests from said at least one collaborative application which query the state of the display are sent only to said input focus participant; and said requests from said at least one collaborative application which initialize resource identifiers are sent to all of said plurality of participants.

4. The management system of claim 3, wherein selected responses from said plurality of participants to requests are sent to said at least one collaborative application based on the category of request to which said response is responsive.

5. The management system of claim 4, wherein:

responses to requests to draw or change the state of said plurality of participants' resources are sent only from said master participant;

responses to requests to query the state of the display are sent from said input focus participant;

responses to requests which query the state of said plurality of participants, not directly related to the display, are only sent from said master participant;

responses to requests which query the state of input devices are sent only from said input focus participant; and responses to requests which initialize resource identifiers are sent only from said master participant.

6. The management system of claim 1, wherein said means for selectively classifying comprises means for classifying events, wherein events are classified into categories and selected events are forwarded to said at least one collaborative application based on the category of the event.

7. The management system of claim 6, wherein said event categories comprise:

events due to a user interaction, events which cause an application to redraw itself, events from another application, events which reflect a change in state of said plurality of participants, and events which reflect a change in state of said at least one collaborative application's resources.

8. The management system of claim 7, wherein:

said events due to a user interaction are forwarded only from said input focus participant;

said events due to a user interaction which may trigger a participant switch are forwarded only from a non-input focus participant, and said input focus role is switched to said non-input focus participant sending the event;

said events which cause said at least one collaborative application to redraw itself are sent from all of said plurality of participants;

said events from another application are sent only from said master participant;

said events which reflect a change in the state of said plurality of participants are sent only from said master participant; and said events which reflect a change in the state of said at least one collaborative application's resources are sent only from said input focus participant.

9. A method for management and classification of requests and their subsequent responses for a multiple participant system including a collaborative application and a non-collaborative application, comprising the steps of:

sending requests asking a participant to draw, or change a state of a participant's resources, from said collaborative application to all participants;

sending requests querying a state of a display from said collaborative application to an input focus participant, and sending any replies to such requests only from the input focus participant to said collaborative application;

sending requests querying a state of a participant from said collaborative application to a master participant, and sending responses to such requests from the master participant to said collaborative application;

sending requests querying or changing a state of input devices from said collaborative application to the input focus participant, so as to permit the manipulation and execution of said non-collaborative application by all other participants and sending responses to such requests from the input focus participant to said collaborative application; and sending requests initializing resource identifiers for said collaborative application from said collaborative application to all participants, and sending responses to such requests from all participants to said collaborative application.

10. The method of claim 9 further comprising the steps of:

sending events, due to a user interaction, to the collaborative application if they are from an input focus participant;

sending events, due to a user interaction, to said collaborative application if they are to switch the input focus to another participant in said conference;

sending events, which cause the collaborative application to redraw itself, to said collaborative application if they are from a participant in the conference, sending events, from another application to said collaborative application if they are from a master participant;

sending events, which reflect a change in the state of a participant, to said collaborative application if they are from the master participant;

sending events, caused by a change in the state of a participant's resources, to said collaborative application if they are from the input focus participant.

* * * * *